(12) United States Patent
Moeller et al.

(10) Patent No.: US 9,714,655 B2
(45) Date of Patent: Jul. 25, 2017

(54) ROTARY DEVICE AND A METHOD OF DESIGNING AND MAKING A ROTARY DEVICE

(75) Inventors: Gunnar Moeller, Hagen (DE); Marcus Ardron, Edinburgh (GB); Anthony O. Dye, Girton (GB)

(73) Assignee: EPICAM LIMITED, Linton, Cambridge (GB)

( * ) Notice: Subject to any disclaimer, the term of this patent is extended or adjusted under 35 U.S.C. 154(b) by 514 days.

(21) Appl. No.: 13/516,121

(22) PCT Filed: Dec. 17, 2010

(86) PCT No.: PCT/GB2010/052128
§ 371 (c)(1),
(2), (4) Date: Dec. 20, 2012

(87) PCT Pub. No.: WO2011/073674
PCT Pub. Date: Jun. 23, 2011

(65) Prior Publication Data
US 2013/0142685 A1    Jun. 6, 2013

(30) Foreign Application Priority Data

Dec. 17, 2009 (GB) .................................. 0921968.4

(51) Int. Cl.
*F01C 1/16* (2006.01)
*F03C 2/08* (2006.01)
(Continued)

(52) U.S. Cl.
CPC ................ *F04C 2/02* (2013.01); *F01C 1/084* (2013.01); *F01C 1/123* (2013.01); *F01C 1/20* (2013.01);
(Continued)

(58) Field of Classification Search
CPC .. F01C 1/084; F01C 1/08; F01C 1/123; F01C 2/02; F01C 2240/20; F01C 2250/30
(Continued)

(56) References Cited

U.S. PATENT DOCUMENTS 3,057,543 A * 10/1962 Marsden ................. F04C 18/16
418/189
5,096,399 A * 3/1992 Mosemann et al. ....... 418/201.3
(Continued)

FOREIGN PATENT DOCUMENTS

| WO | 91/06747 | 5/1991 |
| WO | 98/35136 | 8/1998 |
| WO | 2005/108745 | 11/2005 |

*Primary Examiner* — Deming Wan
(74) *Attorney, Agent, or Firm* — Pillsbury Winthrop Shaw Pittman LLP

(57) ABSTRACT

A rotary device includes a first rotor rotatable about a first axis and having at its periphery a recess bounded by a curved surface, and a second rotor counter-rotatable to the first rotor about a second axis, parallel to the first axis, and having a radial lobe bounded by a curved surface, the first and second rotors being coupled for intermeshing rotation, wherein the first and second rotors of each section intermesh in such a manner that on rotation thereof, a transient chamber of variable volume is defined, the transient chamber having a progressively increasing or decreasing volume between the recess and lobe surfaces, the transient chamber being at least in part defined by the surfaces of the lobe and the recess; the ratio of the maximum radius of the lobe rotor and the maximum radius of the recess rotor being greater than 1.

15 Claims, 10 Drawing Sheets

(51) Int. Cl.
    *F04C 18/14*     (2006.01)
    *F04C 2/02*     (2006.01)
    *F01C 1/08*     (2006.01)
    *F01C 1/12*     (2006.01)
    *F01C 1/20*     (2006.01)

(52) U.S. Cl.
    CPC .... *F04C 2240/20* (2013.01); *F04C 2250/301* (2013.01)

(58) Field of Classification Search
    USPC .... 418/201.1–202, 206.1, 206.5, 206.6, 189, 418/190
    See application file for complete search history.

(56) References Cited

U.S. PATENT DOCUMENTS

| | | | |
|---|---|---|---|
| 5,947,713 A * | 9/1999 | Ohman et al. | 418/201.3 |
| 7,008,201 B2 * | 3/2006 | Heizer | 418/201.1 |
| 2006/0078453 A1 * | 4/2006 | Lee | F01C 1/084 418/201.1 |

* cited by examiner

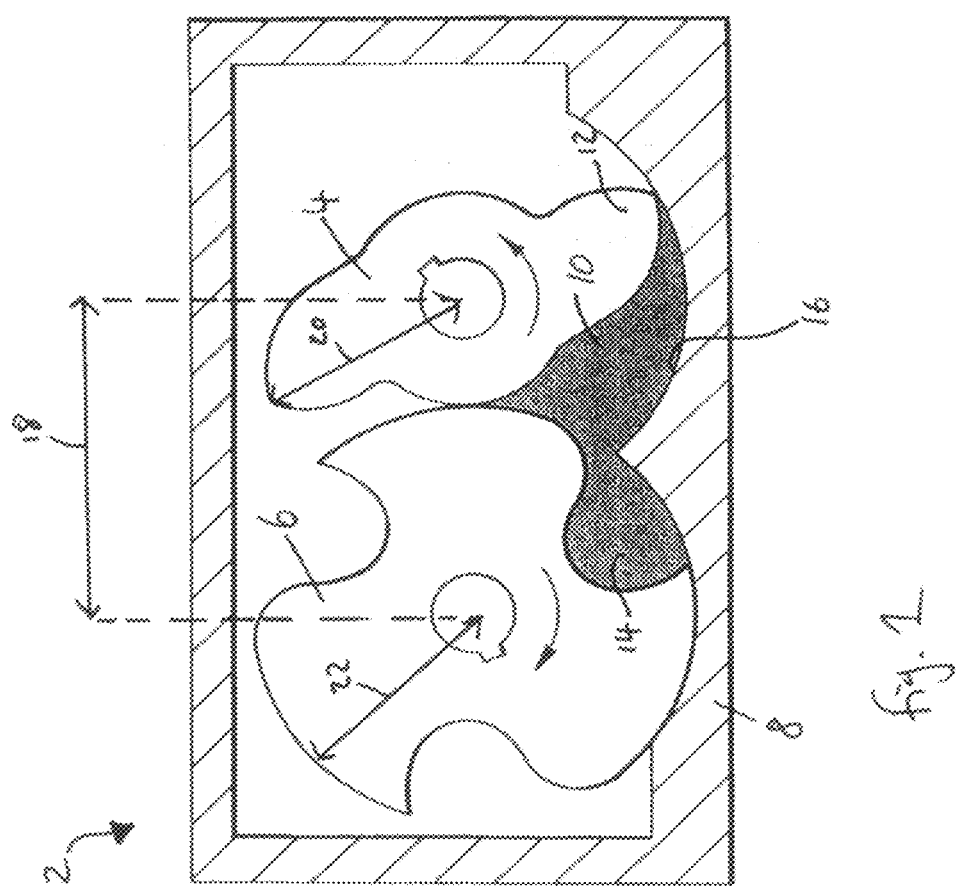

ROTARY DEVICE AND A METHOD OF DESIGNING AND MAKING A ROTARY DEVICE

CROSS REFERENCE TO RELATED APPLICATIONS

This application is the National Phase entry of PCT/GB2010/052128, which claims priority to Great Britain Patent Application No. 0921968.4, filed Dec. 17, 2009. The content of these applications is incorporated herein by reference in their entirety.

The present invention relates to a rotary device and to a method of designing and making a rotary device. Typically the rotary device might be an engine, a compressor, an expander or a supercharger. When used herein, the term "rotary device" includes but is not limited to, any or all of the above.

Rotary engines are known that use a pair of rotors to achieve compression or expansion by displacement. The engines typically utilise the interaction between pairs of lobed and recessed rotors, in which the volume change applied to a compressible working fluid is achieved in a manner determined by the cross-sectional shape of the rotor pairs.

In WO-A-91/06747, the entire contents of which are hereby incorporated by reference, there is disclosed an internal combustion engine comprising separate rotary compression and expansion sections. Each of the compression and expansion sections is a rotary device comprising a first rotor rotatable about a first axis and having at its periphery a recess bounded by a curved surface, and a second rotor counter-rotatable to said first rotor about a second axis, parallel to said first axis, and having a radial lobe bounded by a curved surface. The first and second rotors are coupled for intermeshing rotation. The first and second rotors of each section intermesh in such a manner that on rotation thereof, a transient chamber of variable volume is defined. The transient chamber has a progressively increasing (expansion section) or decreasing (compression section) volume between the recess and lobe surfaces.

The manner of the interaction relies on the fact that the surfaces are contoured such that during passage of said lobe through the recess, the recess surface is continuously swept, by both a tip of said lobe and a movable location on the lobe. The moving tip and location on the lobe can each be said to define a locus. The location on the lobe progresses along both the lobe surface and the recess surface, to define the transient chamber. Thus, in such devices the form of the rotors is important and it is necessary that they should conform with the requirement to provide a sweep of the lobe through the recess, in which two minimum clearance points (at the tip and the movable location on the lobe) are maintained for the duration of the volume change cycle from a maximum volume at the start of the cycle to an effectively zero volume at the end of the cycle (for a compressor) and an effective zero volume increasing to a capacity limited maximum volume in the case of an expander.

These devices work well in that the low friction function means they are comparatively efficient as compared to other known rotary devices or indeed other engines. They are "low friction" in that the rotors do not actually contact each other but instead there is a minimum clearance between the rotors at the two points mentioned above.

Subsequent improvements and modifications to the basic form of such devices added new features. In WO-A-98/35136, the entire contents of which are hereby incorporated by reference, there is disclosed the use of helical forms of the rotors in the axial direction and a variable maximum possible volume for the transient chamber. Furthermore, in WO-A-2005/108745, the entire contents of which are hereby incorporated by reference, there is disclosed a method and apparatus by which the port flow area of such devices is increased. Indeed, in WO-A-2005/108745, an endplate was provided at the axial end of the recess rotor that enclosed the transient chamber of variable volume. A valve was provided in the endplate and an opening was provided in the surrounding housing. As the recess rotor rotates, the valving action between the endplate and the housing serves to control the flow of working fluid into and out of the transient chamber during an operating cycle. The sizing and positioning of the valve in the endplate and the opening in the housing enables accurate control of the rotary device.

The modifications and additions of WO-A-98/35136 and WO-A-2005/108745 did not change the form of the rotors nor their manner of interaction.

Rules were established which governed the distance apart of the central axes of rotation of the rotors and the magnitude of the outer radius of both rotors. In the case of the distance between axes of rotation, it was known that if this was reduced beyond a certain extent, then rotor forms could not be devised which would complete the interaction without either fouling or creating unavoidable leakage areas. Where this limit precisely lay in geometrical terms which could be related to other geometrical rotor parameters however, was unknown. It was therefore considered unsafe to reduce it arbitrarily below one and one third times the outer radius of the lobe. Once this parameter was fixed, then any reduction in the outer radius of the lobe rotor alone, without change in the radius of the recess rotor, would necessarily reduce the maximum 2-dimensional area swept by the lobe and therefore would reduce the swept volume of the machine. Subsequent models were therefore developed in which equality of outer radius dimensions for each of the recess and lobe rotors was retained.

This limitation, together with the limited value of the distance between the rotor axes, necessarily constrained the inner radius of the lobe rotor, i.e. the radius of the lobe rotor core, in order to provide rolling contact with the segments of the circumference of the recess rotor between the recesses. It also determined the maximum penetration of the lobe into the recess rotor.

According to a first aspect of the present invention, there is provided a rotary device comprising a first rotor rotatable about a first axis and having at its periphery a recess bounded by a curved surface, and a second rotor counter-rotatable to said first rotor about a second axis, parallel to said first axis, and having a radial lobe bounded by a curved surface, the first and second rotors being coupled for intermeshing rotation, wherein the first and second rotors of each section intermesh in such a manner that on rotation thereof, a transient chamber of variable volume is defined, the transient chamber having a progressively increasing or decreasing volume between the recess and lobe surfaces, the transient chamber being at least in part defined by the surfaces of the lobe and the recess; the ratio of the maximum radius of the lobe rotor and the maximum radius of the recess being greater than 1.

Thus, the present rotary device provides for a radius of the lobe rotor to be larger than that of the recess rotor and therefore enables the working volume of the device to be increased on a per cycle basis. This change to the previously established form of the rotor geometry increases the 2-dimensional sweep area through the interaction cycle. When translated into a 3-dimensional design, this change allows the maximum swept delivery volume per revolution to be increased by more than 100 per cent when compared with rotors of the same overall dimensions but following the previously established rules.

Previously, if the radial length of the lobe were to be increased by making the outer radius of the lobe greater than the radius of the recess rotor, then there could be no certainty that an effective interaction between the rotors could be achieved. In the present case, it has been recognised that the outer radius of the lobe can be greater than the radius of the recess rotor whilst still providing a functioning rotary device. Furthermore, the increased radius of the lobe provides for a greater swept area during each cycle.

There is a desire to generate a means by which the interaction of the rotors could be modelled and then to use the generated means to provide a new engine having optimised rotors such that swept volume and therefore power-per-cycle can be maximised.

The nature of the constraints discussed above emphasizes the lack of a clear mathematical model by which the interaction between the rotors could be understood or by which rules could be established to distinguish rotor forms with characteristics capable of supporting effective gas displacement without leakage and without fouling.

Preferably, the geometry of the or each lobe is determined by the inner radius of the lobe $\rho_{Li}$, the outer rotor radius at the tip of the lobe $\rho_{Lo}$, the outer radius of the recess rotor $\rho_{Po}$ and a circular arc segment $A_l$ of radius $R_l$ defining a bulk of the lobe.

In one embodiment, the geometry of the or each lobe is, in addition, determined by a circular arc segment $A_c$ of radius $R_c$ wherein the arc segment $A_l$ defines the bulk of the lobe from its tip to an inflection point and the circular arc segment $A_c$ defines a base of the lobe connecting between the arc segment $A_l$ and the core of the lobe.

In one embodiment, the position of the centre of the circular arc segment $A_l$ is defined in dependence on the separation of the centre of the circular arc segment $A_l$ from the centre of the lobe rotor.

Thus, in the absence previously of a basis for determining rotor shape, new physical models developed for practical applications could only be reasonably assured of success provided that they conformed to the parametric relationships of the geometrical entities which defined their predecessors, i.e. by ensuring equality of outer radius dimensions for both rotors.

According to a second aspect of the present invention there is provided a method of designing the rotors for a rotary device having a lobe rotor and a recess rotor coupled for intermeshing rotation, wherein the lobe and recess rotors intermesh in such a manner that on rotation thereof, a transient chamber of variable volume is defined, the transient chamber having a progressively increasing or decreasing volume between the recess and lobe surfaces, the method comprising: determining the geometry of the or each lobe in dependence on the inner radius of the lobe $\rho_{Lio}$ the outer rotor radius at the tip of the lobe $\rho_{Lo}$, the outer radius of the recess rotor $\rho_{Po}$ and a circular arc segment $A_l$ of radius $R_l$ defining a bulk of the lobe. Preferably the method also comprises making a lobe rotor having the determined geometry.

In a preferred embodiment, the geometry of the or each lobe is, in addition, determined by a circular arc segment $A_c$ of radius $R_c$ wherein the arc segment $A_l$ defines the bulk of the lobe from its tip to an inflection point and the circular arc segment $A_c$ defines a base of the lobe connecting between the arc segment $A_l$ and the core of the lobe.

A method and device is provided by which rotors can be designed and built so as to provide a functioning engine capable of improved performance as compared to previous engines. A means is provided to realise designs of the rotor interaction which conform to the characterisation requirement established in the aforesaid prior art but which are not necessarily constrained by the arbitrary limits to which the prior art was subject.

In the present case, the search for improved performance from rotors of given overall size, has led to an exploration of the general rules which limit the size and shape of lobe and recess rotors which are capable of interaction in the manner defined as acceptable in the prior art cited above. A 2-dimensional mathematical model is hereby provided, in which the geometrical form of the pair of interacting rotors is represented by a minimum number of key parameters whose relative magnitudes determine the properties of an effective pair of interacting rotors.

Use of this mathematical model to explore the potential for improved performance has led to the recognition that effectively interacting rotor forms are possible in which the maximum radius of the lobe rotor can be advantageously extended to a value substantially greater than that of the recess rotor. This change to the previously established form of the rotor geometry increases the 2-dimensional sweep area through the interaction cycle. When translated into a 3-dimensional design, this change allows the maximum swept delivery volume per revolution to be increased by more than 100 per cent when compared with rotors of the same overall dimensions but following the previously established rules.

The mathematical model that is preferably used to determine parameters for the rotors to enable the present rotary device to operate is set out in detail in the Appendix forming part of the description of this patent application.

According to a third aspect of the present invention, there is provided a rotary device having a lobe rotor and a recess rotor in which the lobe rotor has an outer radius and an inner radius and the inner radius is minimised so as to maximise swept area or volume of the lobe.

Preferably, the swept area is maximised in accordance with the equation:

$$\rho_{Po} + \rho_{Li} \leq \frac{1}{q}\sqrt{(1+q)^2 \rho_{M_l}^2 + \frac{1}{27}(1+2q)^3 R_l^2}$$

in which $\rho_{po}$ is the outer radius of the recess rotor;

$\rho_{Li}$ is the inner radius of the lobe rotor;

$\rho_{Ml}$ is the separation between the centre of the lobe rotor and the centre of the circle from which the arc that at least in part defines the shape of the lobe is taken;

q is the ratio of angular velocities of the recess and lobe rotor; and $R_l$ is the radius of the arc defining at least in part the shape of the lobe.

This may be thought of as a condition on the curvature of the main lobe segment $A_l$.

Embodiments of the present invention will now be described in detail with reference to the accompanying drawings, in which:

FIG. 1 shows a schematic representation of the rotary device of WO-A-91/06747 (it is the same as FIG. 8 of WO-A-91/06747);

Figure 8:
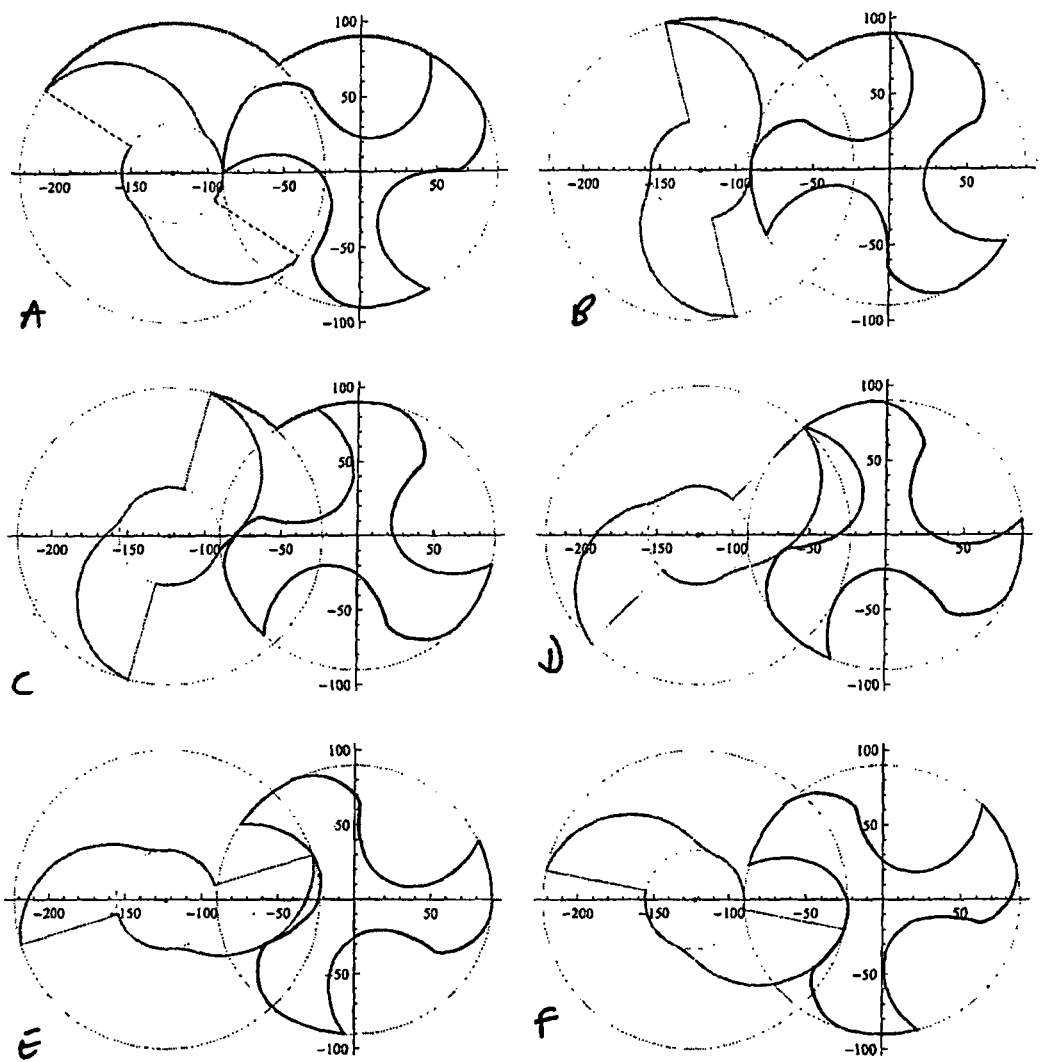
Figure 9:
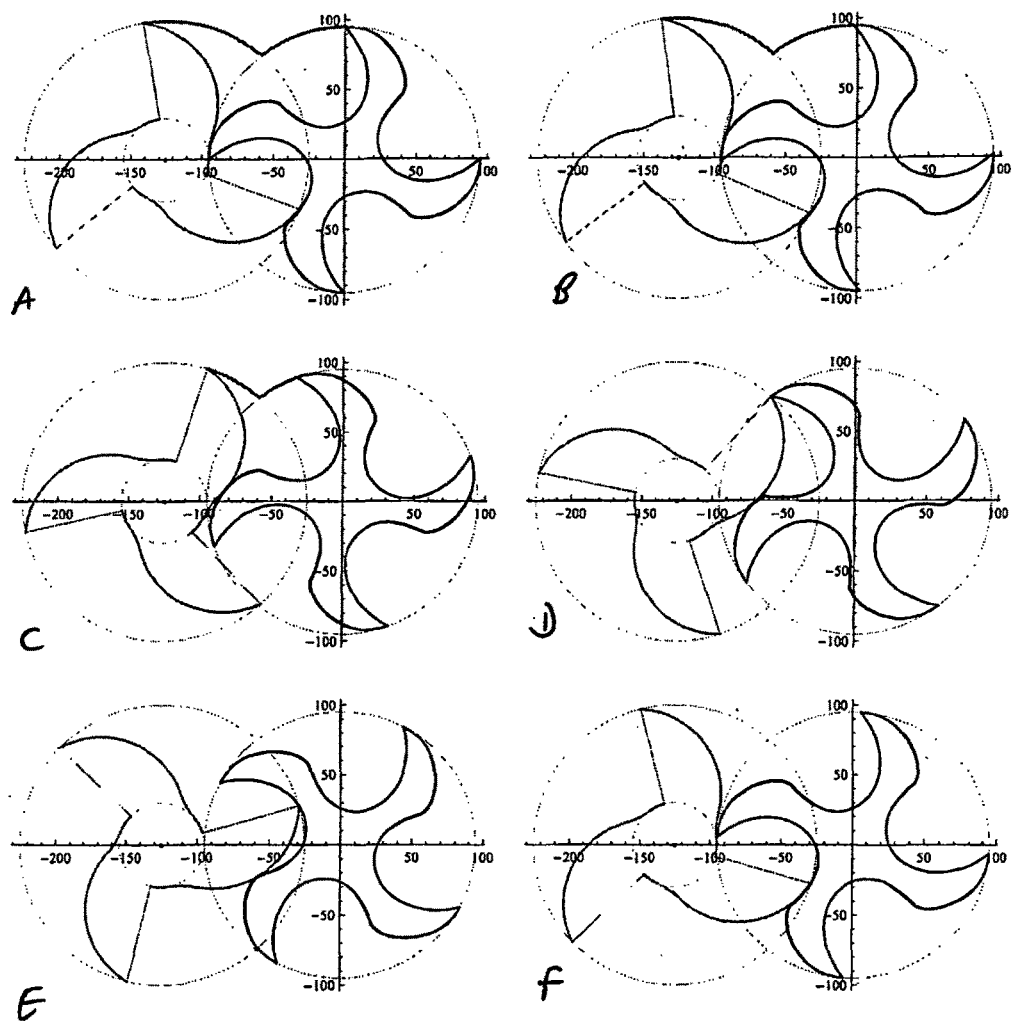

FIG. 1 shows a schematic representation of the rotary device of WO-A-91/06747 and, as mentioned above is the same as FIG. 8 of WO-A-91/06747. The rotary device 2 comprises a lobe rotor 4 and a recess rotor 6 contained within a housing 8. A transient chamber of variable volume 10 is defined at least in part by the surfaces of the lobe 12 and recess 14 of the respective rotors 4 and 6. In this particular example, a curved containment wall 16 is provided as part of the housing 8 and this also serves to form the transient chamber of variable volume 10 together with the lobe 12 and recess 14. As explained above, in this rotary device 2 the separation 18 between the axes of rotation of the lobe rotor 4 and recess rotor 6 is fixed and the outer radius dimension is the same for both rotors. In other words, the radius 20 of the lobe rotor 4 is fixed at the same value as the radius 22 of the recess rotor 6. The rotors each have a core, e.g. such as a central cylindrical component, on which the recesses and/or lobes are formed.

In contrast, in the present rotary device the radius of the lobe rotor and the radius of the recess rotor are different such that an increased swept area (in 2D) and consequently, volume (in 3D) can be achieved without increasing the overall size of the rotary device.

In an example, the two rotors are sized and configured in such a way that it is possible to increase the outer radius of the lobe rotor so that it is larger than that of the recess rotor. Comparing this with the previous arrangement using a pair of intermeshing rotors of given equal outer radius and given distance between the rotor axes, then the change is seen only as an increase in the tip radius of the lobe rotor. Thus, the arc described by the lobe tip describes a larger circular area than the recess rotor. It has been recognised by the inventors that it is possible that the close contact point remote from the tip of the lobe, i.e. near to the base of the lobe, is able to maintain close proximity to successive points on the surface of the recess to enable the familiar displacement of 2 dimensional area between the lobe and recess to be executed in the same manner as was previously possible.

The result of making this change in geometry is significant. The result is to effect a substantially increased swept volume from the paired rotor device on each cycle of operation. As an example, when comparing the new geometry with a previous design, it is shown that the swept volume delivery per revolution of the lobe rotor is twice that of the previous design for rotors having the same shaft centre distance.

In a previous design with shaft centre distance set at a value such that the maximum possible volume of the transient chamber of variable volume was 125 cc, the lobe rotor had four lobes and the recess rotor had six recesses, each interaction yielding a swept volume of 120 cc, thus making a total of 480 cc. per revolution of the lobe rotor.

Using the geometry of embodiments of the present invention in which the ratio of the maximum radius of the lobe and the maximum radius of the recess is greater than 1, the increased penetration of the lobe also increases the length of the arc traversed by the lobe tip from the start of the cycle. Thus, in this particular example, it is only possible to accommodate two lobes which requires a matching three-recessed complementing rotor. Nevertheless, the cycle swept volume for the new geometry is 500 cc. per lobe which means that the new design can deliver 1 Litre per revolution of the lobe rotor.

Rotor lengths are preferably kept constant between previous and new geometries in this comparison.

Figure 2A:
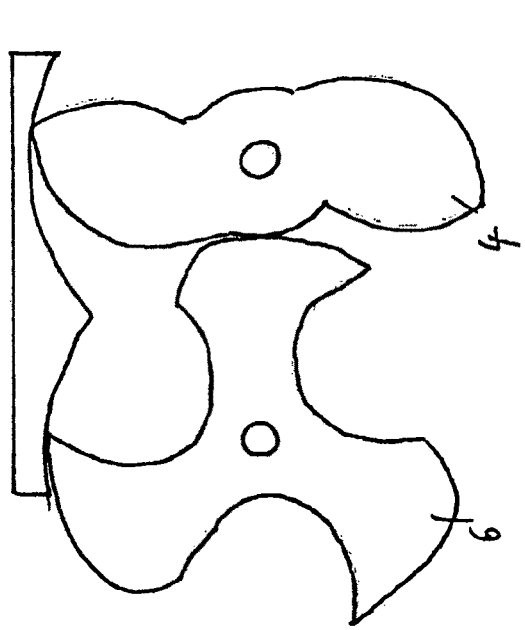
FIGS. 2A to 2D show schematic representations of rotor pairs in which the radius of the lobe rotor is greater than that of the recess rotor.
Figure 2C:
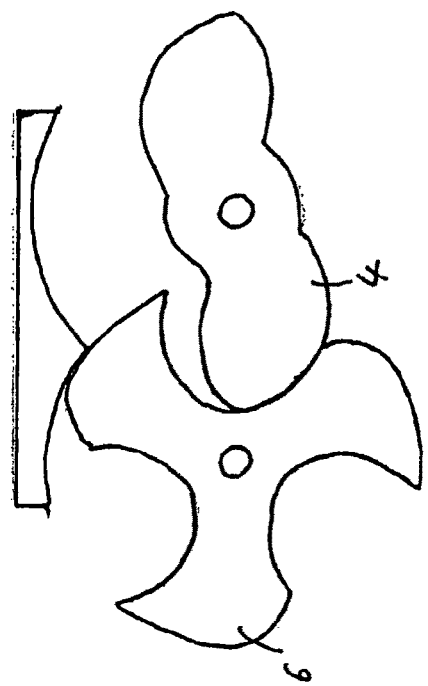
Figure 2B:
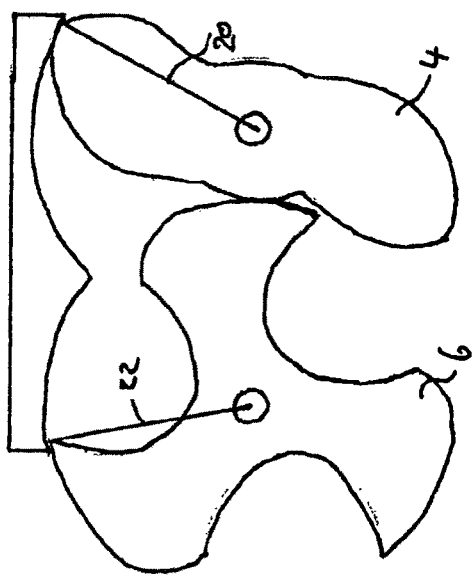
Figure 2D:
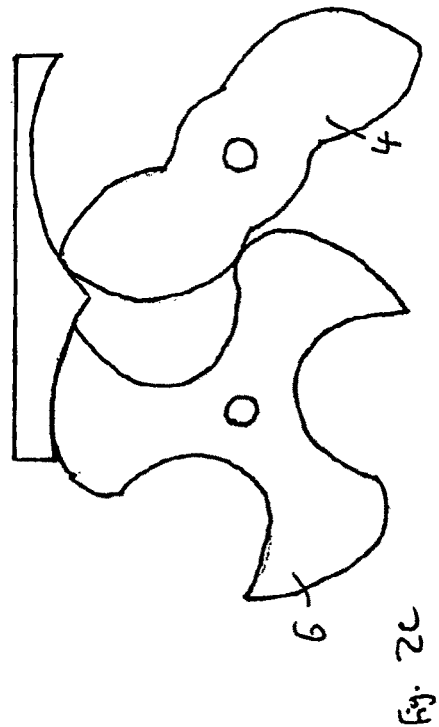

FIGS. 2A to 2D show schematic representations of rotor pairs in which the radius of the lobe rotor is greater than that of the recess rotor. As can be seen, the radius 20 of the lobe rotor 4 is greater than that 22 of the recess rotor 6. A single pair of rotors is shown in four different stages of a cycle of rotation. In FIG. 2A the tip of the lobe rotor (rotating anticlockwise) first engages with the curved containment wall. Together with the recess in the recess rotor a transient chamber of variable volume is first defined within this cycle. In FIG. 2B the rotors have rotated further, the lobe rotor rotating anticlockwise and the recess rotor rotating clockwise. The transient chamber of variable volume has decreased in size and so any working fluid trapped in the chamber at the start of the cycle i.e. when the chamber is first formed, will have been correspondingly compressed. In FIGS. 2C and 2D the compression cycle continues. Despite the difference in radius of the lobe rotor and the recess rotor the transient chamber is still suitably defined and the required clearance between the two rotors is maintained. Thus, the increased lobe rotor radius leads to an increase in swept volume per cycle.

Figure 3:
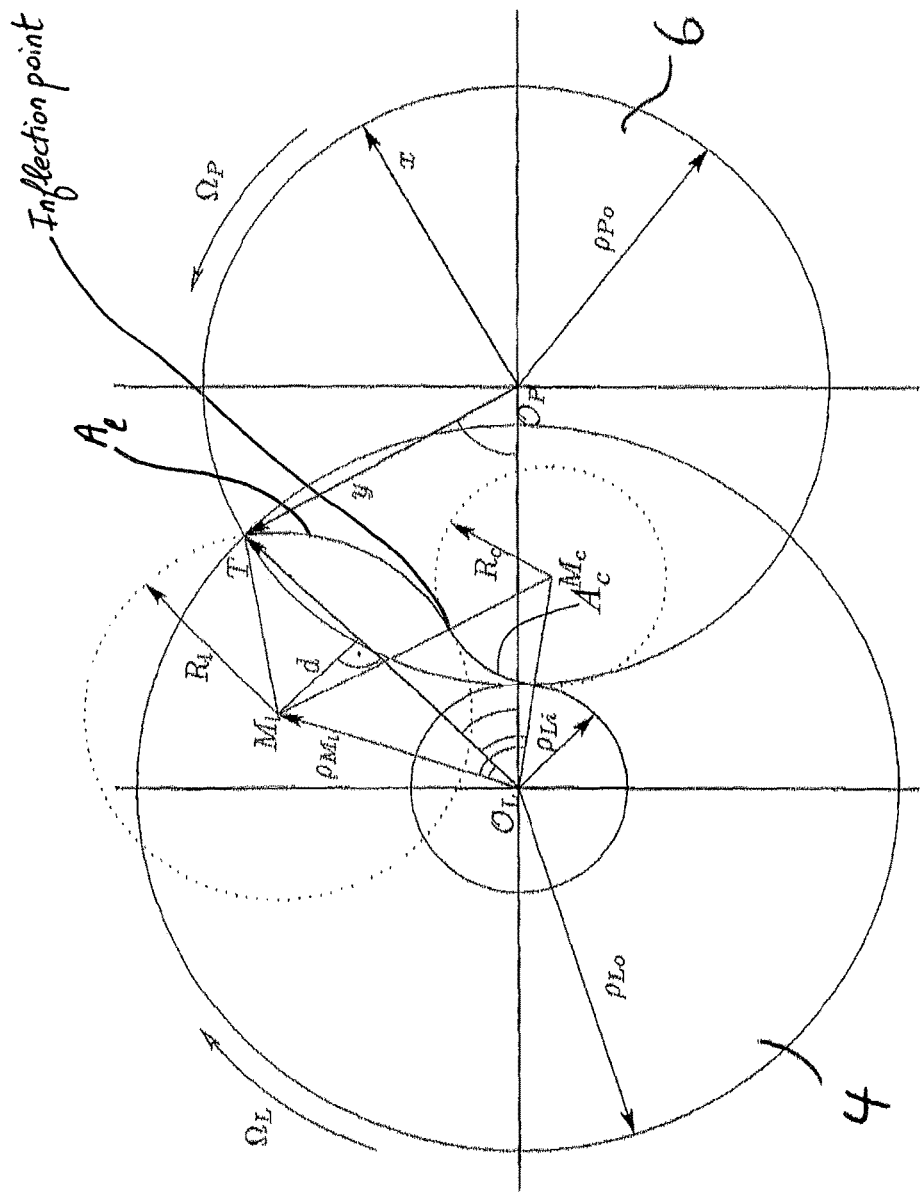
FIG. 3 is a schematic representation of a rotary device including a lobe rotor and a recess rotor used in the derivation of a mathematical model to develop and design new rotors.
Figure 4:
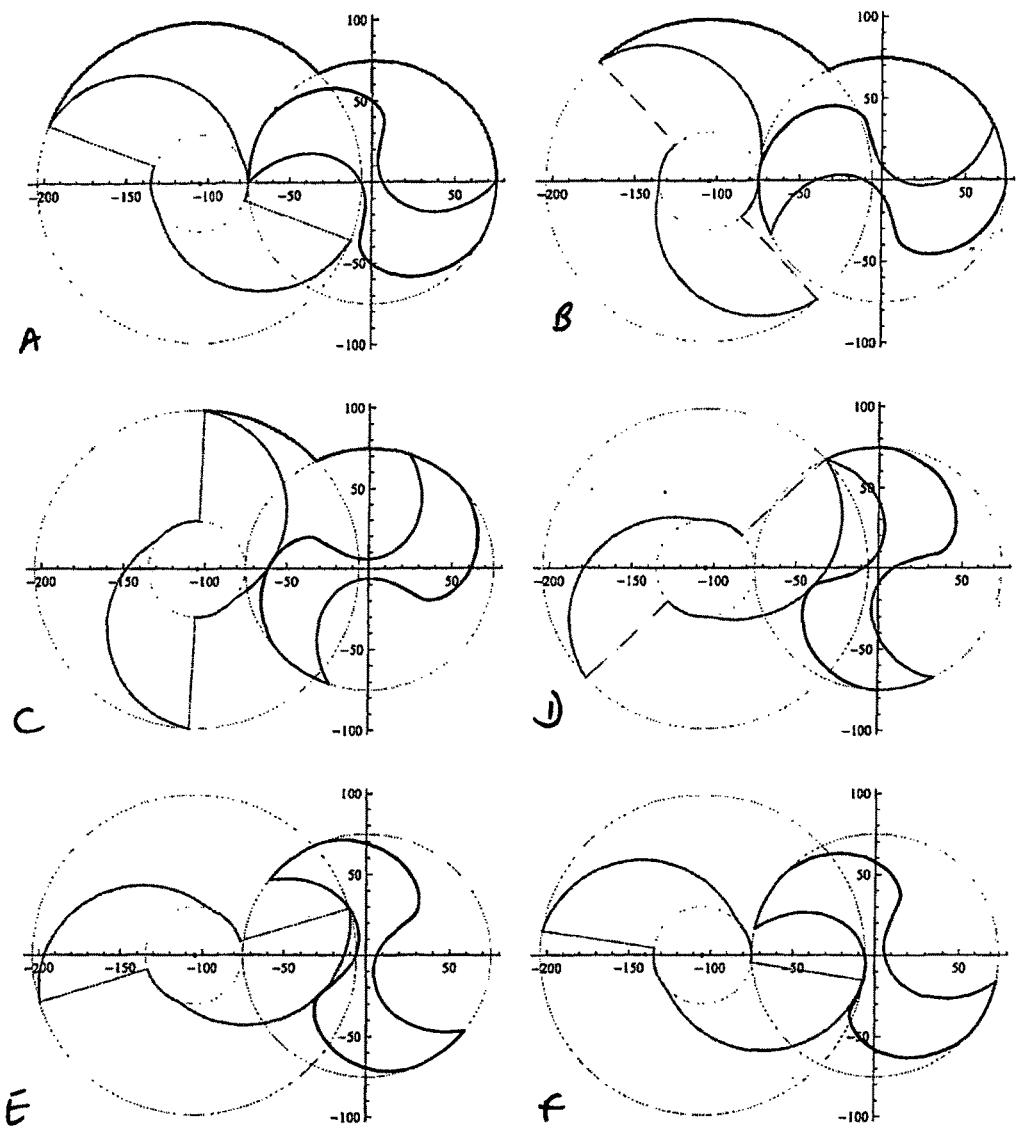
FIGS. 4A to 4F and 10A to 10F are schematic representations of rotor pairs for use in rotary devices.

FIG. 3 is a schematic representation of a basic geometry of the displacement engine or rotary device, as used to determine a mathematical model for use in rotor design and manufacture. The rotary device includes a lobe rotor 4 arranged in this example to rotate in a clockwise direction, and a recess rotor 6 arranged in this example to rotate in an anti-clockwise direction. The rotary device is shown in the state of rotation where the tip of the lobe T first penetrates the recess rotor. In other words although the more forward part of the lobe profile is already within the outer perimeter of the recess rotor at the instant shown in FIG. 3, the tip T is just about to penetrate the outer perimeter. It will be appreciated that it is the "front" surface of the lobe that determines its interaction with the recess. The following or rear surface can be any convenient or desired shape. The lobe may be shaped in its rear surface or body so as to minimise the amount of material required to make it to minimise weight of the rotors.

In the example shown, the y-axis of the co-rotating coordinate system (x, y) in the recess frame is chosen such that it pierces T at this instant. The shape of the lobe is, in this example, defined by the two circles of Radius $R_l$ and $R_c$ for the bulk of the lobe and its base. As shown there are various angles near centres of the lobe $O_L$ and the centre of the recess $O_P$.

These angles are defined by triangles of named points, namely $$\phi_{Ml} = /(M_l, O_L, T),$$

$$\phi_{Mc} = /(M_c, O_L, T),$$

$$\phi_{lc} = /(M_l, O_L, M_c),$$

$$\alpha_L = /(O_P, O_L, T), \text{ and}$$

$$\alpha_P = /(O_L, O_P, T),$$

where the angle defined is near the second of each triple of points.

FIGS. 4A to 4F and 10A to 10F are schematic representations of rotor pairs for use in rotary devices.

FIGS. 4A to 4F show a schematic representation of an interacting rotor pair at various stages during a cycle of interaction. The lobe rotor is shown rotating clockwise and the recess rotor is shown rotating anti-clockwise. In this example there are two lobes and two recesses. The views shown in the figure are the start of the cycle (FIG. 4A) when a compression chamber can first be formed with the housing (represented by a bolder dark line at the upper boundary), the rotation when the base of the lobe first penetrates the recess rotor (FIG. 4B), the time about half way between the base of the lobe and the tip of the lobe entering the recess rotor (FIG. 4C), the time when the tip of the lobe first penetrates the recess rotor (FIG. 4D). Next, in FIG. 4E, there is shown the position when the lobe and recess rotors have rotated further such that the transient chamber of variable volume is formed entirely between the curved lobe surface and recess and can be seen to have significantly reduced in volume as compared to the previous figure (FIG. 4D). Last, in FIG. 4F, the end of the cycle is shown when the inner and outer locus meet.

With reference to the parameters defined above with respect to FIG. 3, the values for the parameters chosen for this configuration are $\rho_{Li}$=30 mm, $\rho_{Lo}$=99 mm, $R_f$=64 mm, $R_c$=37 mm, $\rho_{Mi}$=37.5 mm, $\rho_{Po}$=75 mm. Although the values, in this example and the examples below shown in and described with reference to FIGS. 5A to 5F and 9A to 9F are given in units of mm, it will be understood that these can equally be thought of as an arbitrary basic unit of length in that the dimensions of the rotary device are fully scalable. For simplicity, the trailing or following edge of the lobe is drawn simply as a straight line. Any appropriate or desired shape may be used for this trailing edge. What is important is the leading edge of the lobe that interacts with the surface of the recess. In practice the trailing edge is preferably shaped so as to avoid sharp corners. For example, it might be continuously contoured or curved.

FIGS. 5A to 5F show a schematic representation of an interacting rotor pair at various stages during a cycle of interaction. The lobe rotor is shown rotating clockwise and the recess rotor is shown rotating anti-clockwise. In this example there is a single lobe interacting with a single recess. In addition, this example illustrates a case where the lobe consists of a single circle segment. As in FIGS. 4A to 4F, the snapshots shown represent the start of the cycle (FIG. 5A) and the points of penetration at the base (FIG. 5B) and at the tip (FIG. 5D), as well as the cycle end (FIG. 5F) and intermediate positions (FIGS. 5C and 5E). In this particular case of a single lobe, the earliest useful start of the cycle is given when the enclosed volumes within the lobe and recess rotors first communicate with each other, leading to a large total sweep angle and volume per cycle. The values for the parameters chosen for this configuration are $\rho_{Li}$=35 mm, $\rho_{Lo}$=100 mm, $R_f$=75 mm, $\rho_{Po}$=75 mm. As in the example above, the dimensions of the rotary device are fully scalable.

FIGS. 6A to 6F show a schematic representation of an interacting rotor pair at various stages during a cycle of interaction. The lobe rotor is shown rotating clockwise and the recess rotor is shown rotating anti-clockwise. In this example there is a single lobe interacting with a single recess. As in FIG. 5, this particular example illustrates a special case where the lobe consists of a single circle segment. As in FIG. 4, the snapshots shown represent the start of the cycle and the points of penetration at the base and at the tip, intermediate positions as well as the cycle end. In this particular case of a single lobe, the earliest useful start of the cycle is given when the enclosed volumes within the lobe and recess rotors first communicate with each other, leading to a large total sweep angle and volume per cycle. This configuration requires a large fraction of the circumference to be enclosed by a casing. The values for parameters chosen for this configuration are $\rho_{Li}$=40 mm, $\rho_{Lo}$=100 mm, $R_f$=74 mm, $\rho_{Po}$=65 mm. As in the examples above, the dimensions of the rotary device are fully scalable.

FIGS. 7A to 7F show a schematic representation of an interacting rotor pair at various stages during a cycle of interaction. The lobe rotor is shown rotating clockwise and the recess rotor is shown rotating anti-clockwise. In this example there are two lobes and three recesses. As in FIG. 4, the snapshots shown represent the start of the cycle and the points of penetration at the base and at the tip, intermediate positions as well as the cycle end. The lobe is shaped such that the maximum volume of the compression chamber is, maximized for a given total width of the engine. The values for the parameters chosen for this configuration are $\rho_{Li}$=30.5 mm, $\rho_{Lo}$=103.2 mm, $R_f$=70 mm, $R_c$=25 mm, $\rho_{Mi}$=40 mm, $\rho_{Po}$=92.8 mm. As in the examples above, the dimensions of the rotary device are fully scalable.

FIGS. 8A to 8F show a schematic representation of an interacting rotor pair at various stages during a cycle of interaction. The lobe rotor is shown rotating clockwise and the recess rotor is shown rotating anti-clockwise. In this example there are two lobes and three recesses. As in FIG. 4, the snapshots shown represent the start of the cycle and the points of penetration at the base and at the tip, intermediate positions as well as the cycle end. In comparison to the example shown in FIGS. 7A to 7F, this example illustrates a heavier recess rotor. The values for the parameters chosen for this configuration are $\rho_{Li}$=33 mm, $\rho_{Lo}$=100 mm, $R_f$=60 mm, $R_c$=50 mm, $\rho_{Mi}$=42.5 mm, $\rho_{Po}$=90 mm. As in the examples above, the dimensions of the rotary device are fully scalable.

FIGS. 9A to 9F show a schematic representation of an interacting rotor pair at various stages during a cycle of interaction. In this example there are three lobes and four recesses. As in FIG. 4, the snapshots shown represent the start of the cycle and the points of penetration at the base and at the tip, intermediate positions as well as the cycle end. Next, in FIG. 9E, there is shown the position when the lobe and recess rotors have rotated further as compared to the previous figure (FIG. 9D) such that the transient chamber of variable volume is formed entirely between the curved lobe surface and recess (as it is also in FIG. 9D) and can be seen to have significantly reduced in volume as compared to FIG. 9D. With three lobes, the cycle length is shortened significantly, which may be useful for applications where it is important or desired to minimize leakage flow. The values for the parameters chosen for this configuration are $\rho_{Li}$=30 mm, $\rho_{Lo}$=100 mm, $R_f$=60 mm, $R_c$=50 mm, $\rho_{Mi}$=46 mm, $\rho_{Po}$=95mm. As in the examples above, the dimensions of the rotary device are fully scalable.

As explained above and also in section D in the appendix, a general condition can be recognised for validity of a rotor configuration. The parameters that are most favourable in order to maximize the maximum possible volume of the transient compression or expansion chamber of variable volume are now considered. As explained in detail in the appendix (section E, entitled "Maximising the Lobe Length"), a large fraction of the volume is swept by the lobe rotor and it is thus useful to increase the length of the outer lobe radius $\rho_{Lo}$. An alternative or additional way of achieving this, i.e. other than increasing $\rho_{Lo}$, involves reducing $\rho_{Po}$ followed by a resealing of all length parameters such as to recover the same overall size of the rotary device.

Independently, minimizing the inner lobe radius $\rho_{Li}$ also contributes to an increase of the total swept volume. Thus an independent aspect of the present invention (which may of course be combined with other aspects or embodiments of the invention) provides a rotary device having a lobe rotor and a recess rotor arranged for intermeshing interaction in which the lobe rotor has an outer radius and an inner radius and the inner radius is minimised so as to maximise swept area or volume of the lobe. Preferably, the rotary device comprising a first rotor rotatable about a first axis and having at its periphery a recess bounded by a curved surface, and a second rotor counter-rotatable to said first rotor about a second axis, parallel to said first axis, and having a radial lobe bounded by a curved surface, the first and second rotors being coupled for intermeshing rotation, wherein the first and second rotors of each section intermesh in such a manner that on rotation thereof, a transient chamber of variable volume is defined, the transient chamber having a progressively increasing or decreasing volume between the recess and lobe surfaces, the transient chamber being at least in part defined by the surfaces of the lobe and the recess.

As explained in section E of the appendix, a criterion which limits both these types of change is the condition on the curvature of the main lobe segment $A_I$, as formulated in equation (26) and which is reformulated as equation (30). Rotor configurations that maximize swept volume correspond to parameters such that equation (30) is nearly satisfied as an equality, i.e. is approximately satisfied as an equality. Thus by satisfying this condition it is possible to maximise the swept volume in such a way as to increase the effective working volume of the rotary device per cycle without necessarily requiring a difference in the outer radii of the lobe and recess rotors. Greater detail on this is given in the appendix.

FIGS. 10A to 10F show an example of a geometry illustrating the case of a configuration with two lobes and three pockets, where the ratio of the rotor diameters is kept to be $\rho_{Lo}/\rho_{Po}=1$, In this case, i.e. with parity between the lobe and recess rotor radii, the swept volume can still be increased by reducing the inner lobe radius. As in FIGS. 4A to 4F, the snapshots shown include the start of the cycle (top left) and the points of penetration at the base (top right) and at the tip (centre right), as well as the cycle end (bottom right) and two intermediate positions. The parameters chosen for this configuration are $\rho_{Li}=24$ u, $\rho_{Lo}=96$ u, $R_I=60$ u, $R_c=40$ u, $\rho_{MI}=41.1$ u, $\rho_{PO}=96$ u.

The rotor pairs may be provided within a housing such as that shown in and described above with reference to FIG. 1 and may or may not be provided with a moveable containment wall so as to enable the maximum possible volume of the transient chamber of variable volume to be varied. In other words, in all cases the actual volume of the chamber will vary during the cycle, from the maximum to the minimum (zero usually) but in addition means may be provided to vary the maximum possible volume for the chamber in any one cycle. Indeed, it will be appreciated that rotor pairs of the type described herein can be used in rotary devices as disclosed in any or all of WO-A-91/06747, WO-A-98/35136 and WO-A-2005/108745.

It will be appreciated that the above examples are non-limiting and any suitable form may be used for the rotors. What is important is that the radius of the lobe rotor and the recess rotor is not the same which then enables an increased swept volume to be achieved with the same overall size of device. In summary and with reference to the description above of FIG. 3, it will be appreciated that the model, for simplicity, is executed in 2 dimensions. The 3 dimensional form of the rotors is typically a projection of the two-dimensional section (optionally helically formed, i.e. with some rotation about the projection axis) and so the model applies in 3 dimensions too.

As set out in the prior art referred to above, an efficient rotational displacement device, is obtained by helically extruding a single two-dimensional cross sectional area of the lobe and recess rotors. By extension and reference to the prior art it is therefore sufficient to describe the parameters defining their two-dimensional shapes, as well as the constraints to which the different parameters are subject.

In summary, the model operates by defining some fundamental parameters and in dependence on these determining a shape for a lobe rotor and the corresponding recess rotor. From the fundamental parameters, a number of others may be derived including a number of angles and further lengths. These two forms of parameter may be referred to as "fundamental geometrical parameters" and "derived geometrical parameters". The model discussed in the appendix below uses one specific example as shown in FIG. 3. However, as explained in section "F" entitled "Variants and Example Configurations" the model can be used to determine a suitable shape for a lobe rotor and recess rotor having any desired number of lobes and recesses and to determine the shapes of lobes made up of any appropriate number of arc segments. Thus, although in parts the appendix refers to specific figures and examples, this has general applicability as will be appreciated by a man skilled in the art.

Once the rotors have been designed using the method described above the lobe rotor and the corresponding recess rotor are made. These may be made using appropriate materials such as steel and using any known method such as die casting, injection moulding, extrusion of appropriate materials etc.

Embodiments of the present invention have been described with particular reference to the examples illustrated. However, it will be appreciated that variations and modifications may be made to the examples described within the scope of the present invention.

Appendix—Mathematical Model For Use In Determining Rotor Shape

A. Fundamental Geometrical Parameters

The defining element of the rotational displacement device (which we shall also refer to in short as the engine) is the geometry of the lobe(s). The pocket rotor is obtained as the involute form of the lobe geometry. The lobe rotor consists of a $n_L$, identical lobes, offset relative to each other by an angle $2\pi/n_L$. Similarly, the pocket rotor features $n_P$ identical pockets, offset by an angle $2\pi/n_P$. Both rotors are linked by a pair of gears such that they rotate at a fixed ratio of angular velocities $q=n_L/n_P$, given by the ratio of the number of lobes $n_L$ to the number of pockets $n_P$. As shown in FIG. 3, the geometry of the lobe is defined by the following elements and parameters:

1, the inner radius defining the core of the lobe $\rho_{Li}$,
2, the outer radius at the tip of the lobe $\rho_{Lo}$,
3, a circular arc segment $A_I$ of radius $R_I$ defines the bulk of the lobe from the tip to an inflection point,
4, a second arc segment $A_c$ of radius $R_c$ defines the base of the lobe, connecting smoothly between the segment $A_I$ and the core of the lobe, 5, to fully specify the geometry, the position of the centre of the circular segment $A_l$ has to be defined, we chose to indicate the separation $\rho_{M_l}$ of its centre $M_l$ from the centre of the lobe rotor.

In addition to these five parameters for the lobe, the outer radius of the pocket rotor $\rho_{P_o}$ completes the defining list of defining system parameters. All further aspects of the geometry derive from this set of six lengths as well as the ratio of number of lobes to pockets: $\{\rho_{Li}, \rho_{Lo}, R_l, R_c, \rho_{M_l}, \rho_{P_o}, q\}$.

B. Derived Geometrical Parameters

The length parameters given above uniquely define the geometry. For convenience we derive from these a number of angles and further lengths. Additional lengths which we shall refer to below are given by the distance between the axes of the two rotors $$R_O = \rho_{P_o} + \rho_{Li}, \quad (1)$$

the separation of $M_1$ and $M_c$ $$R_{lc} = R_l + R_c, \quad (2)$$

and the separation of $M_c$ and $O_L$ $$\rho_{M_c} = R_c + \rho_{Li}. \quad (3)$$

Various angles are obtained by application of the cosine law in the triangles present in the geometry. In particular, we define two angles $\alpha_L$ and $\alpha_P$, which relate to a special state of rotation of the system. These two angles are realized in the configuration where the tip of the lobe T first penetrates into the interior of the pocket rotor. Considering the triangle $\Delta(O_P, O_L, T)$ at this instant, we define the two angles $\alpha_L = \angle(O_P, O_L, T)$, and $\alpha_P = \angle(O_L, O_P, T)$ (where the angle defined is near the second of each triple of points), such that $$\alpha_L = \arccos\left[\frac{\rho_{Lo}^2 + R_O^2 - \rho_{Po}^2}{2\rho_{Lo}R_O}\right], \quad (4)$$

at the corner $O_L$, and $$\alpha_P = \arccos\left[\frac{\rho_{Po}^2 + R_O^2 - \rho_{Lo}^2}{2\rho_{Po}R_O}\right] \quad (5)$$

at the corner $O_P$. Further angles are defined for the lobe geometry and do not imply a particular state of rotation. All of these angles are measured near the centre of the lobe $O_L$, and are defined by triangles of points named in FIG. 3, in particular $\phi_{M_l} = \angle(M_l, O_L, T)$, $\phi_{M_c} = \angle(M_c, O_L, T)$, and $\phi_{lc} = \angle(M_1, O_L, M_c)$.

These angles equate to $$\phi_{M_l} = \arccos\left[\frac{\rho_{M_l}^2 + \rho_{Lo}^2 - R_l^2}{2\rho_{M_l}\rho_{Lo}}\right], \quad (6)$$

$$\phi_{lc} = \arccos\left[\frac{\rho_{M_l}^2 + \rho_{M_c}^2 - R_{lc}^2}{2\rho_{M_l}\rho_{M_c}}\right], \quad (7)$$

$$\phi_{M_c} = \phi_{lc} - \phi_{M_l} \quad (8)$$

Prior patents [WO-A-91/06747, GB98/003451] have described specific geometries of this type using the offset d of the point $M_l$ from the radius towards the tip $\overrightarrow{O_LT}$. This quantity can be used interchangeably with $\rho_{M_l}$ in the definition of the geometry. Defining the angle $\gamma_T = \angle(R_O, T, M_l) = \arccos[(\rho_{Lo}^2 + R_l^2 - \rho_{M_l}^2)/(2\rho_{Lo}R_l)]$, we have $d = R_l \sin\gamma_T$.

C. The Pocket Geometry

The shape of the pocket rotor follows by imprinting the shape of the lobe under revolution of the two rotors. There are two points of contact between the two rotors. The first point of contact is located initially at the base of the lobe defined by the intersection of $A_c$ and $\overrightarrow{O_LM_c}$ and is travelling towards the tip T of the lobe as the lobe penetrates the pocket rotor. The second point is given by the tip of the lobe. These two points are referred to below as the inner and outer locus. The movement of these two loci defines the geometry of the pocket. However, some conditions need to be verified by the lobe geometry to assure that a functional pocket exists, which are considered in the subsequent section. Here, we first demonstrate how to construct the shape of the pocket.

1. Coordinate Systems

First, we need to define a convenient coordinate system in which to express the pocket shape. We choose the system (x, y) shown in FIG. 3, as a frame which is stationary in the rotating frame of the pocket rotor. Its relative position to the lobe rotor is defined by the point of first contact of the lobe tip, defined to lie of the y-axis. In addition, we define a time t measured in radians of rotation of the lobe rotor. The origin of the time coordinate t=0 is associated with the state of rotation when the base of the lobe $A_c$ first penetrates the pocket rotor, i.e., when $O_L$, $M_c$ and $O_P$ lie on a common line. Positive time t corresponds to clockwise rotation by the angle t of the lobe rotor. The configuration shown in FIG. 3 therefore displays time $t_{tip} = \phi_{M_c} - \alpha_L$. For typical configurations, $t_{tip}$ is positive, however it can in principle be negative.

A second useful frame of reference ($\xi, \eta$) can be defined for the lobe rotor, such that the unit vector $\vec{e}_\xi$ continually points towards the origin of the pocket rotor, and $\vec{e}_\eta$ is obtained by rotating this vector by $\pi/2$ (counterclockwise), i.e., $\vec{e}_\eta = \vec{e}_z \times \vec{e}_\xi$, with $\vec{e}_z$ the unit vector pointing outwards of the plane of projection of FIG. 3. Due to rotation of the pocket system (x, y), the point $O_L$ describes the trajectory $$\vec{r}_{O_L}(t) = R_O\begin{pmatrix} \cos\varphi_{O_L} \\ \sin\varphi_{O_L} \end{pmatrix}, \quad (9)$$

where $\phi_{O_L}$ is measured from the x-axis $$\varphi_{O_L} = \frac{\pi}{2} + \alpha_P - q(t + \alpha_L - \phi_{M_c}). \quad (10)$$

Consequently, the (time-dependent) unit vectors of the system ($\xi, \eta$) are given by $$\vec{e}_\xi = \begin{pmatrix} -\cos\varphi_{O_L} \\ -\sin\varphi_{O_L} \end{pmatrix}, \quad (11)$$

and $$\vec{e}_\eta = \begin{pmatrix} \sin\varphi_{O_L} \\ -\cos\varphi_{O_L} \end{pmatrix}.$$

The reference system $(\xi, \eta)$ is not attached to the rotating frame of the lobe. Instead, angles of points in the lobe system decrease linearly with the time variable, $t=0$ corresponding to $\overrightarrow{O_L M_c} = \rho_{M_c} \vec{e}_\xi$.

2. Curve Segments Defining the Pocket

The motion of single points in the lobe system, such as the lobe tip T, as well as the center points $M_l$ and $M_c$ can now be straightforwardly expressed:

$$\vec{r}_T(t) = \vec{r}_{O_L}(t) + [\cos(\phi_{M_c} - t)\vec{e}_\xi + \sin(\phi_{M_c} - t)\vec{e}_\eta]\rho_{Lo}, \quad (12)$$

$$\vec{r}_{M_c}(t) = \vec{r}_{O_L}(t) + [\cos(-t)\vec{e}_\xi + \sin(-t)\vec{e}_\eta]\rho_{M_c}, \quad (13)$$

$$\vec{r}_{M_l}(t) = \vec{r}_{O_L}(t) + [\cos(\phi_{l_c} - t)\vec{e}_\xi + \sin(\phi_{l_c} - t)\vec{e}_\eta]\rho_{M_l}, \quad (14)$$

The outer locus is identical with $\vec{r}_T(t)$, while the inner locus is traced out as the involute form of circles with centers $\vec{r}_{M_l}$ and $\vec{r}_{M_c}$. Its trajectory is therefore offset by the respective radius relative to either curve, and the resulting curve segments $C_l$, $C_c$ can be expressed as follows $$\vec{r}_{C_c}(t) = \vec{r}_{M_c} - R_c \vec{e}_z \times \dot{\vec{r}}_{M_c} \quad (15)$$

$$\vec{r}_{C_l}(t) = \vec{r}_{M_c} - R_l \vec{e}_z \times \dot{\vec{r}}_{M_l}, \quad (16)$$

where we have introduced the tangent vectors $T_M = \dot{\vec{r}}_M / \|\dot{\vec{r}}_m\|$ (using the notation $$\dot{\vec{r}} \equiv \frac{d}{dt}\vec{r}$$

for the time derivative, and $\|\vec{r}\|$ to denote the norm of a vector).

As stated above, the inner locus moves from the base of the lobe towards its tip during the compression cycle. The curve delineating the pocket is given as the union of three segments, defined by $\vec{r}_{C_c}$, $\vec{r}_{C_l}$, and $\vec{r}_T$ on the appropriate time intervals. Initially, for times $t \in [0, t_{cl}]$ the inner locus is described by $\vec{r}_{C_c}$, where the final time $t_{cl}$ is defined by the intersection of the curves $C_c$ and $C_l$, that can be obtained by solving $$\dot{\vec{r}}_{M_l}(t_{cl}) \cdot [\vec{r}_{M_l}(t_{cl}) - \vec{r}_{M_c}(t_{cl})] = 0 \quad (17)$$

The solution can be found analytically, and it is of the form $$t_{cl} = 2 \arctan\left\{\frac{a - \sqrt{a^2 + b^2 - c^2}}{b + c}\right\}, \quad (18)$$

abbreviating recurrent expressions $$a = (\rho_{M_c} - \rho_{M_l}\cos\phi_{lc})R_O,$$

$$b = \rho_{M_l} R_O \sin\phi_{lc},$$

$$c = \frac{q+1}{q}\rho_{M_l}\rho_{M_c}\sin\phi_{lc},$$

For times $t_{cl} \leq t \leq t_{end}$, the inner locus is described by $\vec{r}_{C_l}$. Finally, we can obtain the time or angle of rotation for the end of the cycle $t_{end}$, which occurs when the inner and outer locus meet, and $$\dot{\vec{r}}_{M_l}(t_{end}) \cdot [\vec{r}_{M_l}(t_{end}) - \vec{r}_T(t_{end})] = 0 \quad (19)$$

It solution has a similar form as Eq. (18), but with one change in sign:

$$t_{end} = 2 \arctan\left\{\frac{d + \sqrt{d^2 + e^2 - f^2}}{e + f}\right\}, \quad (20)$$

and with the parameters $$d = (\rho_{M_l}\cos\phi_{lc} - \rho_{Lo}\cos\phi_{M_c})R_O,$$

$$e = (\rho_{Lo}\sin\phi_{M_c} - \rho_{M_l}\sin\phi_{lc})R_O,$$

$$f = \frac{q+1}{q}\rho_{M_l}\rho_{Lo}\sin(\phi_{M_l}).$$

D. Constraints on the System Parameters

In the previous section, we have derived mathematical expressions for the curves defining the pocket geometry, Eqs. (12), (15), and (16). However, not all choices of parameters $\{\rho_{Li}, \rho_{Lo}, R_l, R_c, \rho_{M_l}, \rho_{Po}, q\}$ yield well defined pocket geometries. We now proceed to derive the conditions under which a functional unit is obtained.

For a successful compressor geometry, the inner locus, as seen in the rest-frame of the pocket rotor, performs a continuous movement, which excludes any momentary reversals of the velocity as well as intersections of its trajectory with itself. A valid trajectory can be ensured by requiring a negative initial velocity (contrary to the sense of rotation of the pocket rotor), a touching point of the curves $C_c$ and $C_l$ at time $t_{cl}$ and the absence of reversal of the velocity within curve $C_l$. In addition, there are some trivial geometric constraints which we consider first.

1. Triangle Relations

On the level of basic geometry, the lengths defining the lobe geometry have to be chosen such that the two fundamental triangles $\Delta(O_L, T, M_l)$ and $\Delta(O_L, M_c, M_l)$ can be spanned, as described by the triangle relations $|a-b| < c < a+b$ [for a generic triangle $\Delta(a, b, c)$]. Six inequalities follow, namely $$R_l + \rho_{M_l} > \rho_{Lo} \quad (21a)$$

$$\rho_{Lo} + \rho_{M_l} > R_l \quad (21b)$$

$$R_l + \rho_{Lo} > \rho_{M_l} \quad (21c)$$

for the first of the two triangles, and $$\rho_{M_l} + R_l > \rho_{Li} \quad (22a)$$

$$R_l + 2R_c + \rho_{Li} > \rho_{M_l} \quad (22b)$$

$$\rho_{Li} + \rho_{M_l} > R_l \quad (22c)$$

for the second.

2. Initial Velocity of the Inner Locus

In order for the initial velocity of the inner locus to be negative (i.e., moving in the direction from the base to the tip) it is sufficient to demand that the movement of its center has a positive velocity at $t=0$, The trajectory $\rho_{M_c}$ is then forced to describe a loop with strong curvature, that enforces a negative velocity $\vec{r}_{C_c}(0)$. With little algebra, this condition translates to $$R_c > \frac{1}{1+q}[q\rho_{Po} - \rho_{Li}] \quad (23)$$

3. Intersection of the Curves $C_c$ and $C_l$

By construction, the arc segments defining the lobe $A_c$ and $A_l$ share a common tangent where they join. Consequently, the involutes of both arcs generically yield parallel curves $C_c$ and $C_l$ at their touching point. However, $C_c$ has an inflection point accompanied with a reversal of local velocity. This feature must occur after the time of intersecting with $C_l$, in which case it does not affect the geometry. This leads to a condition, which is equivalent to demanding a positive argument of the root in Eq. 18. Simplifying this expression, we arrive at the condition $$-\frac{(1+q)^2}{4q^2}(\rho_{M_c} + \rho_{M_l} - R_c - R_l)(R_c + R_l + \rho_{M_c} - \rho_{M_l}) \times \quad (24)$$

$$(R_c + R_l - \rho_{M_c} + \rho_{M_l})(R_c + R_l + \rho_{M_c} + \rho_{M_l}) + (R_c + R_l)^2 R_O^2 > 0.$$

Note all the factors in parentheses for the first term are positive by virtue of the triangle relations.

4. Bound on the curvature of $\vec{r}_{M_l}$

Finally, one needs to ensure that the curve $C_l$ is well formed. It is typically dominated by a point of inflection where the inner locus remains nearly stationary, and can even reverse its direction. The latter case leads to leakage and should be avoided. Algebraically, this can be expressed as the velocity of the touching point $\vec{r}_{C_l}$ having a positive projection onto the velocity of the center point $\vec{r}_{M_l}$, or in equations $\dot{\vec{r}}_{C_l} \cdot \dot{\vec{r}}_{M_l} > 0$. This translates into a constraint on the (signed) curvature $k_l(t)$ of the curve $\vec{r}_{m_l}$. It is required that $$\kappa_l(t) \equiv \frac{\dot{\vec{r}}_{M_l} \cdot (\vec{e}_z \times \ddot{\vec{r}}_{M_l})}{\|\dot{\vec{r}}_{M_l}\|^3} \leq \frac{1}{R_l} \quad (25)$$

The bound on the signed curvature $k_l(t)$ can only be satisfied if its absolute maximum $\max_t k_l(t)$ satisfies the bound. A pleasingly simple criterion ensues.

$$\rho_{M_l} \leq \frac{1}{1+q}\sqrt{q^2(\rho_{Li} + \rho_{Po})^2 - \frac{1}{27}(1+2q)^3 R_l^2} \quad (26)$$

5. Constraints from Multiple Ppockets

In total, the pocket rotor has to be able to carry $n_p$ pockets. This imposes a limitation on the maximal angle of opening of the pocket. The total opening angle of the pocket $\theta_P$ is given by $$\theta_P = \alpha_P + q(\phi_{M_c} - \alpha_L) \leq \frac{2\pi}{n_P} \quad (27)$$

This criterion only tests for the size of the pockets on the circumference of the lobe rotor. In addition, the pockets need to be well separated in the interior of the rotor as well. This can be checked easily by drawing a given shape of the pockets for a set of input parameters.

6. Geometry of the Lobe

So far, we have not mentioned the shape of the trailing edge of the lobe. As this element has no function other than ensuring mechanical stability of the lobe, it can be designed freely except having to avoid colliding with the pocket rotor. The maximum allowed angle between the tip of the lobe and its trailing edge at the base $\gamma_L$ is therefore limited to the value $$\gamma_L \leq \gamma_L^{max} = \frac{\theta_P}{q} - \phi_{M_c} = \frac{\alpha_P}{q} - \alpha_L. \quad (28)$$

Typically, mechanical stability will require at least $\gamma_L^{max} > 0$. To extend this discussion, we consider the constraint arising from the need that the lobe evacuates the interior of the pocket rotor quickly enough to prevent a collision with the trailing edge of the pocket rotor. The most protruding feature of the trailing edge of the pocket is the point $\tilde{T}$ on the outer radius of the pocket which meets the tip of the lobe T at time $t = \phi_{M_c} - \alpha_L$. In a coordinate system $(x, y)^L$ defined as co-rotating with the lobe, and oriented such that the tip of the lobe lies on its y-axis, the trailing edge of the pocket defines the, curve $$\vec{r}_T^L = (R_O - \rho_{P_o}\cos[\beta(t)])\begin{pmatrix}\sin(\phi_{M_c} - t)\\ \cos(\phi_{M_c} - t)\end{pmatrix} + \quad (29)$$
$$\rho_{P_o}\sin[\beta(t)]\begin{pmatrix}-\cos(\phi_{M_c} - t)\\ \sin(\phi_{M_c} - t)\end{pmatrix},$$

introducing the abbreviation $\beta(t) = \alpha_P + q(\phi_{M_c} - \alpha_L - t)$. The lobe needs to be slim enough not to touch or cross this curve at any point.

E. Maximizing the Lobe Length

Given the criteria for validity of a rotor configuration discussed in section D, we may now ask which parameters are most favorable in order to maximize the volume of the transient compression chamber. A large fraction of the volume is swept by the lobe rotor. It is thus useful to increase the length of the outer lobe radius $\rho_{Lo}$. Rather than thinking of increasing $\rho_{Lo}$, we may equivalently reduce $\rho_{Po}$ followed by a resealing of all length parameters such as to recover the dame overall size of the engine. Independently, minimizing the inner lobe radius $\rho_{Li}$ also contributes to an increase of the total swept volume.

The criterion which limits both these types of change is the condition on the curvature of the main lobe segment $A_l$, Eq. (26), which we can reformulate equivalently to read $$\rho_{Po} + \rho_{Li} \le \frac{1}{q}\sqrt{(1+q)^2 \rho_{M_i}^2 + \frac{1}{27}(1+2q)^3 R_I^2} \qquad (30)$$

Figure 10:
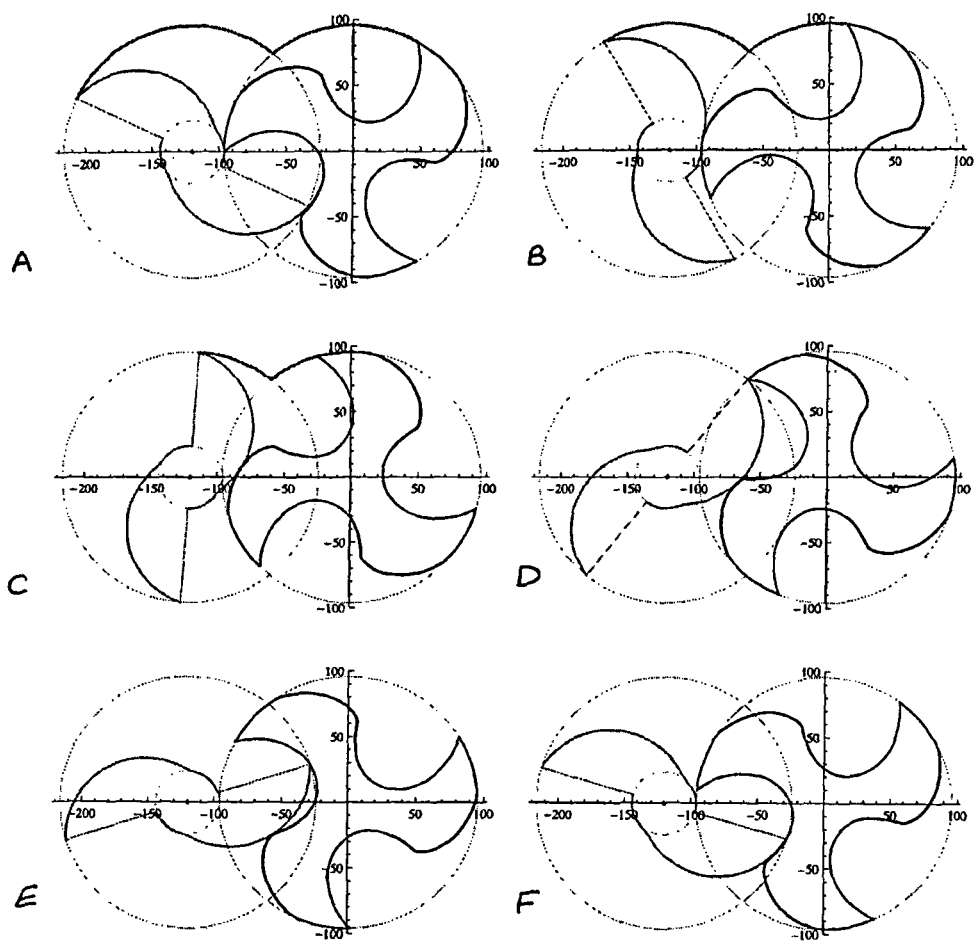

Rotor configurations that maximize swept volume correspond to parameters such that (30) is nearly satisfied as an equality. In particular, previously disclosed rotor configurations in patents WO-A-91/06747 and GB98/00345 did not approach this criterion very closely. Even while keeping the ratio of the outer lobe radii $\rho_{Lo}/\rho_{Po}$ constant, the maximal 2D area for a system of rotors with $\rho_{Po} = \rho_{Lo}$ can be increased substantially by reducing $\rho_{Li}$. To illustrate the effect of this modification, we modify the parameters of the engine previously disclosed in U.S. Pat. No. 6,176,695. One can easily achieve $\rho_{Li}/\rho_{Lo} = 1/4$ as opposed to the value $\rho_{Li}/\rho_{Lo} = 1/2$ given in prior art. In FIG. 10, we enclose a drawing of this particular configuration.

With regard to the other criteria, Eq. (23) can always be fulfilled by choosing $R_c$ sufficiently large. However, the remaining constraints are non-trivial. In particular, when $\rho_{Li}$ is minimized, this may lead to violations of the triangle relations (22a-c), such that $\rho_{M_i}$ needs to be increased while $\rho_{Li}$ is decreased.

F. Variants and Example Configurations

Above, we have given an explicit construction of a geometry which implements the concept of a rotary displacement device with a compression chamber formed by a lobe and pocket rotor that are touching in two points of close contact. The lobe geometry described above consists of precisely two arc segments $A_I$ and $A_c$, however, this is not the only possible way of constructing a geometry in the spirit of patent no. WO-A-91/06747.

1. Lobe Formed of a Single Arc

Figure 5:
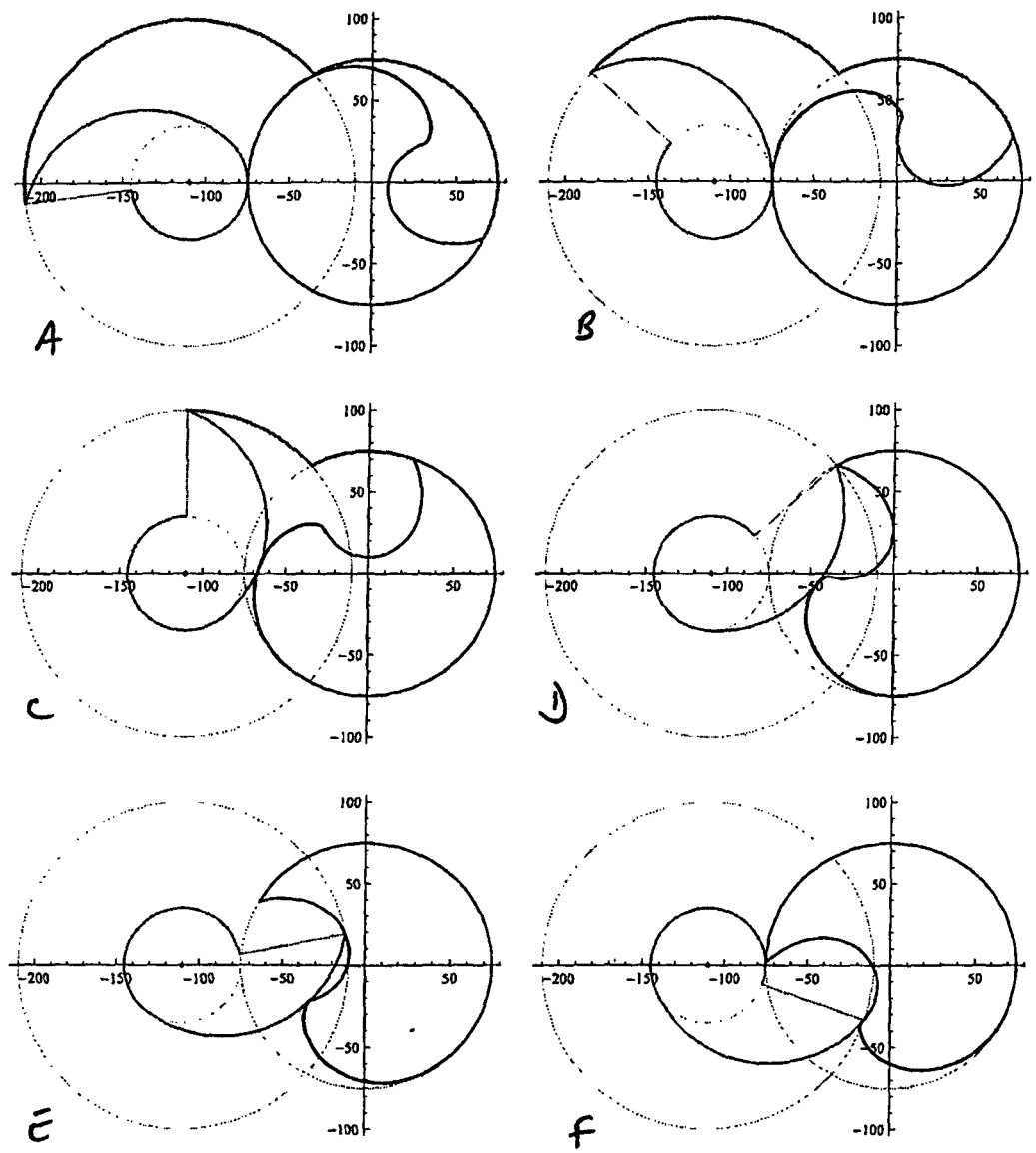
Figure 6:
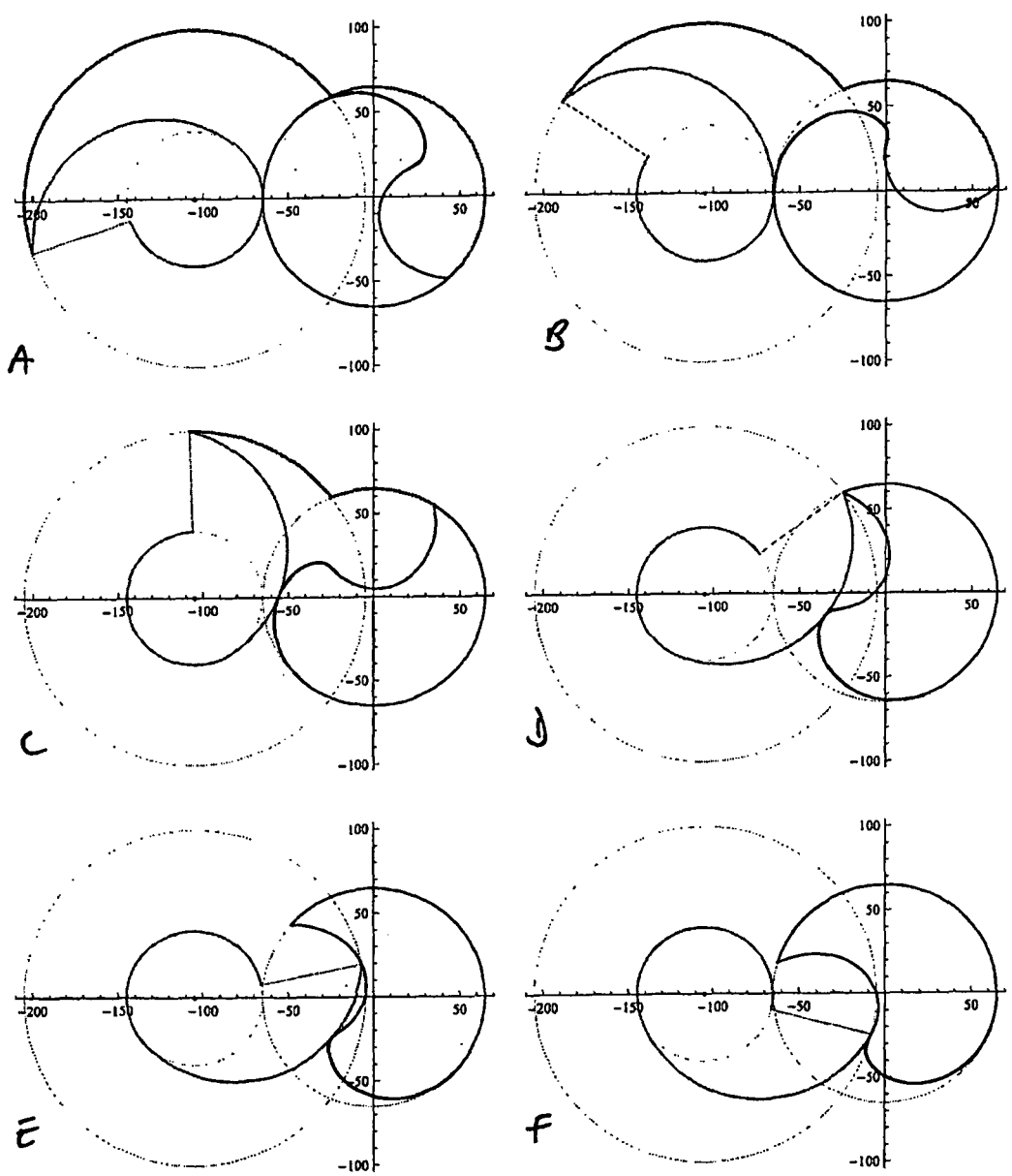
Figure 7:
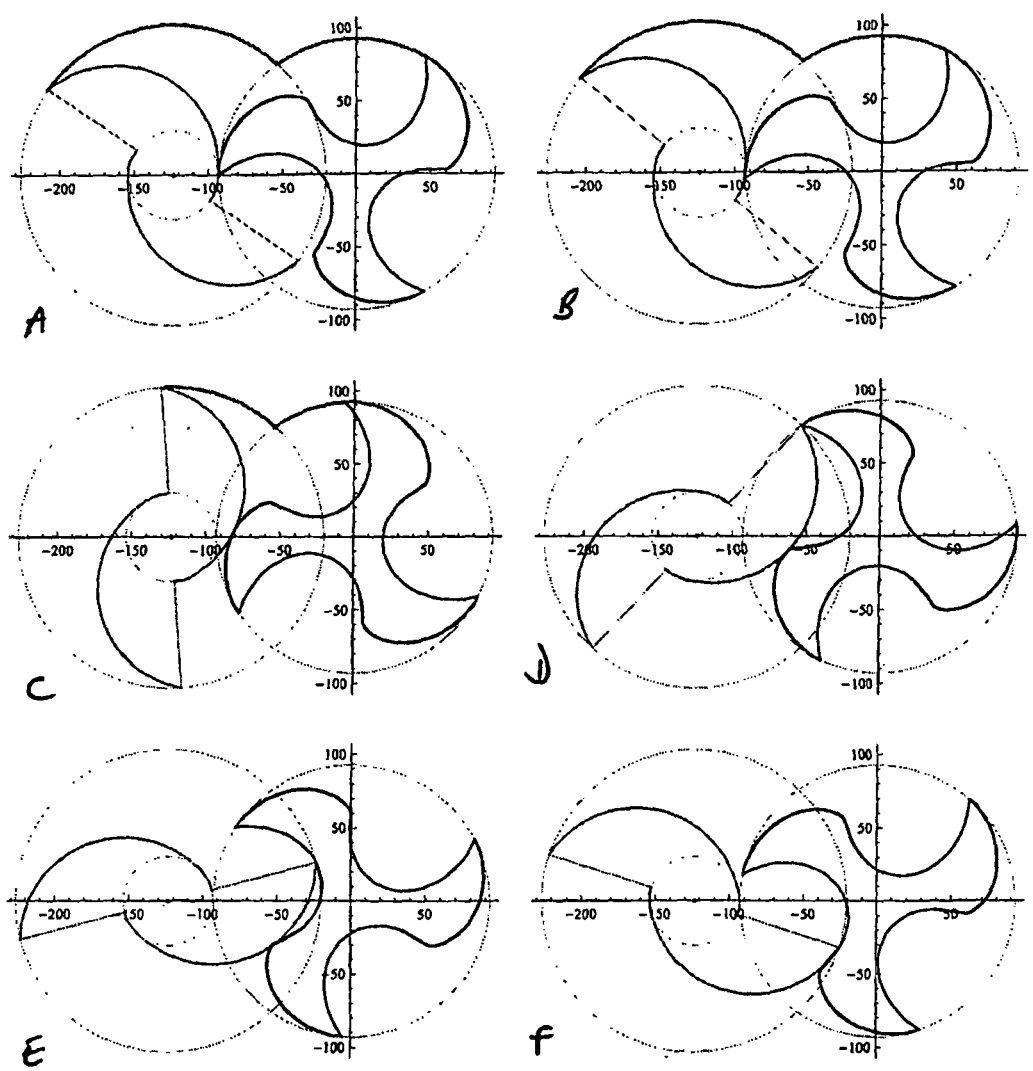

As a special case of the construction presented in this appendix, it is possible to obtain a geometry in which the lobe consists of a single arc segment $A_I$, which touches the lobe core tangentially. In this case, the points $M_I$, $M_c$ and $O_L$ lie on a single line, and the arc $A_c$ does then not define any portion of the lobe and $R_c$ is not a relevant parameter (can be formally chosen to be any positive number). In addition, the triangle relations (22a-c) can be disregarded, and $\rho_{M_I} = R_I - \rho_{Li}$. FIGS. 5 and 6 show example configurations where the lobe consists only of a single arc segment in this fashion.

2. Lobe Formed of More than Two Arc Segments

Following the same geometrical principles, a lobe can be built up from multiple arc segments of different curvature. Generalising the construction given above, the condition defining whether a geometry can be realized is the criterion of non-reversal of the velocity of the inner locus akin to Eq. (26). The main difference arising in the case of multiple arc segments is to replace this equation by a condition of the momentary curvature of the trajectory of the relevant center point for a given segment of the lobe. Generally, the structure of the lobe will be similar to that given in the model of two arcs: the base of the lobe is a convex piece either given by the inner core or a circle segment tangential to it as in the case of the single arc structure in section F1. The next portion of the lobe is concave, and the portion near the lobe tip is again convex. Each of these portions can in principle be composed of multiple arc segments of varying curvature.

To display the versatility of the given construction with two arc segments, a number of possible configurations are included in the section of drawings.

The invention claim is:

1. A method of designing rotors for a rotary device having a lobe rotor and a recess rotor coupled for intermeshing rotation, wherein the lobe and recess rotors intermesh in such a manner that on rotation thereof, a transient chamber of variable volume is defined, the transient chamber having a progressively increasing or decreasing volume between a recess surface of a recess of the recess rotor and a lobe surface of a lobe of the lobe rotor, wherein at least during part of a cycle of rotation the transient chamber is formed entirely between the lobe surface and the recess surface, wherein the recess and lobe surfaces are contoured such that during passage of the lobe through the recess, the recess surface is continuously swept, by both a tip of the lobe and a movable location on the lobe, wherein, in use, the transient chamber functions as an expansion or compression chamber of the rotary device for compression or expansion of a working fluid the method comprising:

determining the geometry of the or each lobe in dependence on an inner radius of the lobe ρLi, an outer rotor radius at the tip of lobe ρLo, and a circular arc segment AI of radius RI defining a bulk of the lobe and the an outer radius of the recess rotor ρPo, wherein the geometry of the or each lobe is, in addition, determined by a circular arc segment Ac of radius Rc wherein the arc segment AI of the radius RI defines the bulk of the lobe from its tip to an inflection point and the circular arc segment Ac of the radius Rc defines a base of the lobe connecting between the are segment AI and the core of the lobe.

2. The method according to claim 1, comprising making the lobe rotor having the determined geometry.

3. The method according to claim 1, comprising making the lobe rotor having the determined geometry.

4. The method according to claim 1, comprising making the lobe rotor having the determined geometry.

5. The rotary device method according to claim 1, in which the position of the centre of the circular are segment AI is defined in dependence on the separation of the centre of the circular are segment AI from the centre of the lobe rotor.

6. A rotary device comprising a first rotor rotatable about a first axis and having at its periphery a recess bounded by a curved recess surface, and a second rotor counter rotatable to said first rotor about a second axis, parallel to said first axis, and having a radial lobe bounded by a curved lobe surface, the radial lobe of the second rotor being a leading lobe in the case of compression or a trailing lobe in the case of expansion, the first and second rotors being coupled for intermeshing rotation, wherein the first and second rotors of each section intermesh in such a manner that on rotation thereof, a transient chamber of variable volume is defined, the transient chamber having a progressively increasing or decreasing volume between the curved recess surface of the first rotor and the curved leading lobe surface in the case of compression or the curved trailing lobe surface of the second rotor in the case of expansion, wherein, in use, the transient chamber functions as an expansion or compression chamber of the rotary device for compression or expansion of a working fluid, the transient chamber being at least in part defined by the curved surfaces of the radial lobe of the second rotor and the recess of the first rotor and at least during part of a cycle of rotation being formed entirely between the curved lobe surface and the curved recess surface, wherein the curved recess and lobe surfaces are contoured such that during passage of the lobe through the recess, the curved recess surface is continuously swept, by both a tip of the lobe and a movable location on the lobe, and a ratio of a maximum radius of the second rotor and a maximum radius of the first rotor being greater than 1, wherein a geometry of the or each lobe is determined by an inner radius of the lobe $\rho Li$, an outer rotor radius at the tip of the lobe $\rho Lo$, an outer radius of the recess rotor $\rho Po$, and a circular arc segment AI of radius RI defining a bulk of the lobe, and wherein the geometry of the or each lobe is, in addition, determined by a circular arc segment Ac of radius Rc wherein the circular arc segment AI of the radius RI defines the bulk of the lobe from its tip to an inflection point and the circular arc segment Ac of the radius Rc defines a base of the lobe connecting between the arc segment AI and a core of the lobe.

7. The rotary device according to claim 6, in which the ratio of the maximum radius of the second rotor and the maximum radius of the first rotor is between 1.1 and 1.5.

8. The rotary device according to claim 7, in which the first and second rotors extend axially in a helical configuration.

9. The rotary device according to claim 6, in which the ratio of the maximum radius of the second rotor and the maximum radius of the first rotor is about 1.3.

10. The rotary device according to claim 6, in which a housing is provided to enclose the first and second rotors.

11. The rotary device according to claim 10, in which the housing includes a moveable containment wall, said wall being moveable so as to vary the maximum possible volume of the transient chamber of variable volume.

12. The rotary device according to claim 6, in which the first and second rotors extend axially in a helical configuration.

13. The rotary device according to claim 6, in which the position of the centre of the circular arc segment AI is defined in dependence on the separation of the centre of the circular arc segment AI from the centre of the lobe rotor.

14. A The rotary device according to claim 6 in which the lobe profile comprises plural arc segments.

15. One or more of an engine, a compressor, an expander, and a supercharger each comprising a rotary device according to claim 6.

* * * * *